Patented Dec. 23, 1924.

1,520,122

UNITED STATES PATENT OFFICE.

FRANK C. GEPHART AND RUDOLPH H. HARRIES, OF NEW YORK, N. Y.; SAID HARRIES ASSIGNOR TO SAID GEPHART.

PROCESS FOR MAKING SOLID, WATER-SOLUBLE TEA PRODUCT.

No Drawing.     Application filed February 21, 1923. Serial No. 620,487.

*To all whom it may concern:*

Be it known that we, FRANK C. GEPHART and RUDOLPH H. HARRIES, citizens of the United States of America, residing at New York, N. Y., have invented new and useful Improvements in Processes for Making Solid, Water-Soluble Tea Product, of which the following is a specification.

Our invention has for its object the production of a solid product of tea containing water soluble extractives of the leaves and buds, or dust therefrom, of suitable species of Thea, which may be used for the production of beverages, having the characteristic aroma, flavor, and other cup qualities of the particular tea used in making the preparation. It is one object of our invention to extract from the tea water soluble extractives thereof, including caffein as well as aroma and flavor. It is a further object to produce a solid product fluffy, granular, or powdery in form, which will dissolve completely on the addition of hot water.

We first make a water infusion of tea which has preferably first been prepared for use by any of the approved methods of fermenting, drying and firing, using approximately 1000 cubic centimeters of water to each 100 grams of tea. This may be steeped in boiling water for about three minutes; or the infusion may be made cold if allowed to stand for from five to forty-eight hours; or may be made warm; or the infusion may be made in any other suitable way, such as by percolation. The infusion is strained and filtered by any suitable method, the straining being accomplished by centrifugal action if desired. If the infusion is made cold, the precaution may well be taken to sterilize the filtrate, and refilter if necessary.

At this point or after concentration it may be desirable to add to the filtrate a quantity of soluble material, preferably having food value and lacking in distinctive flavor, and having the property of binding the aroma and flavor, for instance, suitable carbohydrates, such as lactose (milk sugar), glucose, maltose, cane sugar, dextrine, etc. The soluble water-soluble product does not possess hydroscopicity to any marked degree even when the carbohydrate component is supplied by such highly hygroscopic materials as commercial glucose syrup, commercial maltose syrup, etc. The quantity of such material added may be varied widely, and it affords a ready means of varying the concentration of the product.

The filtrate, with or without the added material, is concentrated, preferably by vacuum, the distillate collected for solvent treatment, and the concentrate subjected to drying, either by vacuum pan, spraying, drum drying, or other suitable method. It is important when using vacuum pan drying that a high vacuum, preferably about 27 inches of mercury, be maintained in the dryer, as the pressure at which the evaporation takes place affects the physical properties of the product, and it is desirable that the product be fluffy in order that it may dissolve instantly when water is added to form the beverage. Enough heat should be applied to the dryer to keep the contents boiling.

The solid (dry) product remaining when the moisture has been driven off contains water-soluble extractives of the tea as well as any carbohydrates previously introduced, with the exception of aroma and flavor-containing substances of a volatile nature which pass off with the moisture during concentration. It is therefore desirable to condense this distillate or a portion thereof and shake it out with a suitable organic solvent to separate the aroma and flavor-containing substances from the water. A suitable solvent is one that does not mix with water, does not dissolve the dry residue, evaporates at a low temperature, and does not in itself impart any odor or flavor to the solid product, such a solvent, for instance, as chloroform, carbon tetrachloride, ether, etc. We may also collect the distillate resulting from drying the concentrate and recover flavor and aroma therefrom by a similar method and add this recovered flavor and aroma to the final product in a similar manner.

The solvent and dissolved substances when separated from the water are sprayed upon or otherwise added to the solid residue, and the solvent is allowed to evaporate, preferably at a low temperature, leaving the aroma-and-flavor-containing substances in the product. The evaporated solvent may be recovered for further use if desired by suitable methods of condensation.

The product may be packed for commercial use in any suitable manner, and is used by placing a suitable quantity, in a cup, and adding hot water which instantly dissolves the product completely, forming a beverage.

Having now described our invention we claim and desire to secure by Letters Patent:

1. The process of making a solid water-soluble preparation of tea having the cup characteristics of the tea used in the preparation of the infusion, which consists in making a water infusion of tea, straining, filtering, evaporating the filtrate to dryness under diminished pressure, collecting at least part of the distillate and shaking it out with a suitable solvent to recover aroma and flavor, separating the solvent containing aroma and flavor from the water and adding it to the solid residue, and evaporating the solvent.

2. The process of making a solid water-soluble preparation of tea having the cup characteristics of the tea used in the preparation of the infusion, which consists in making a water infusion of tea, filtering, adding a suitable carbohydrate, evaporating the filtrate to dryness under diminished pressure, collecting at least part of the distillate and shaking it out with a suitable solvent to recover aroma and flavor, separating the solvent containing aroma and flavor from the water and adding it to the solid residue, and evaporating the solvent.

3. The process of making a solid water-soluble preparation of tea having the cup characteristics of the tea used in the preparation of the infusion, which consists in making a water infusion of tea, filtering, evaporating the filtrate to dryness under diminished pressure, collecting at least part of the distillate and shaking it out with chloroform to recover aroma and flavor, separating the chloroform containing aroma and flavor from the water and adding it to the solid residue, and evaporating the chloroform.

4. The process of making a solid water-soluble preparation of tea having the cup characteristics of the tea used in the preparation of the infusion, which consists in making a water infusion of tea, filtering, adding a suitable sugar, drying the filtrate under diminished pressure, collecting at least part of the distillate and shaking it out with suitable solvent to recover aroma and flavor, separating the solvent containing aroma and flavor from the water and adding it to the solid residue, and evaporating the solvent.

5. The process of making a solid water-soluble preparation of tea having the cup characteristics of the tea used in the preparation of the infusion, which consists in making a water infusion of tea, filtering, adding lactose, evaporating the filtrate to dryness under diminished pressure, collecting at least part of the distillate and shaking it out with a suitable solvent to recover aroma and flavor, separating the solvent containing aroma and flavor from the water and adding it to the solid residue, and evaporating the solvent.

6. The process of making a solid water-soluble preparation of tea having the cup characteristics of the tea used in the preparation of the infusion, which consists in making a water infusion of tea, filtering, adding a suitable carbohydrate, evaporating the filtrate to dryness under diminished pressure, collecting at least part of the distillate and shaking it out with chloroform to recover aroma and flavor, separating the chloroform containing aroma and flavor from the water and adding it to the solid residue, and evaporating the chloroform.

7. The process of making a solid water-soluble preparation of tea having the cup characteristics of the tea used in the preparation of the infusion, which consists in making a water infusion of tea, filtering, adding lactose, evaporating the filtrate to dryness under diminished pressure, collecting at least part of the distillate and shaking it out with chloroform to recover aroma and flavor, separating the chloroform containing aroma and flavor from the water and adding it to the solid residue, and evaporating the chloroform.

8. A solid, water-soluble tea product having the cup characteristics of the tea used in the preparation of the infusion, composed of water-soluble extractives of tea.

9. A solid, water-soluble tea product having the cup characteristics of the tea used in the preparation of the infusion, composed of the solid water-soluble extractives of tea leaves and the volatile extractives to give the original aroma and flavor.

10. A solid, water-soluble tea product having the cup characteristics of the tea used in the preparation of the infusion, composed of water-soluble extractives of tea and suitable carbohydrates.

11. A solid, water-soluble tea product having the cup characteristics of the tea used in the preparation of the infusion, composed, of water-soluble extractives of tea and lactose.

12. A solid, water-soluble tea product having the cup characteristics of the tea used in the preparation of the infusion, composed of the solid water-soluble extractives of tea and the volatile extractives to give the original aroma and flavor and lactose.

13. A solid, water-soluble tea product having the cup characteristics of the tea used in the preparation of the infusion, composed of water-soluble extractives of tea and lactose in approximately equal proportions by weight.

14. A non-hygroscopic, solid, water-soluble tea product having the cup characteristics of the tea used in the preparation of the infusion, composed of water-soluble extractives of tea and suitable carbohydrates.

In testimony whereof we have signed our names to this specification.

FRANK C. GEPHART.
RUDOLPH H. HARRIES.